(12) United States Patent
Gomme et al.

(10) Patent No.: US 9,577,348 B2
(45) Date of Patent: Feb. 21, 2017

(54) COMBINATION ANTENNA

(71) Applicant: NXP B.V., Eindhoven (NL)

(72) Inventors: Liesbeth Gomme, Leuven (BE); Anthony Kerselaers, Louvain (BE)

(73) Assignee: NXP B.V., Eindhoven (NL)

( * ) Notice: Subject to any disclaimer, the term of this patent is extended or adjusted under 35 U.S.C. 154(b) by 14 days.

(21) Appl. No.: 14/718,301

(22) Filed: May 21, 2015

(65) Prior Publication Data
US 2016/0344109 A1    Nov. 24, 2016

(51) Int. Cl.
*H01Q 7/00* (2006.01)
*H01Q 21/28* (2006.01)
*H04W 4/00* (2009.01)
*H01Q 1/27* (2006.01)

(52) U.S. Cl.
CPC .............. *H01Q 21/28* (2013.01); *H01Q 1/273* (2013.01); *H01Q 7/00* (2013.01); *H04W 4/008* (2013.01)

(58) Field of Classification Search
CPC .......... H01Q 21/28; H01Q 1/273; H01Q 7/00; H04W 4/008

USPC .................................................. 343/718, 702
See application file for complete search history.

(56) References Cited

U.S. PATENT DOCUMENTS

| | | | | |
|---|---|---|---|---|
| 6,184,844 | B1 * | 2/2001 | Filipovic | H01Q 1/362 343/853 |
| 8,063,769 | B2 * | 11/2011 | Rofougaran | H04B 5/0012 340/539.1 |
| 8,159,090 | B2 * | 4/2012 | Greene | H02J 17/00 307/104 |
| 2003/0031339 | A1 | 2/2003 | Marshall et al. | |
| 2005/0168396 | A1 | 8/2005 | Victorian et al. | |
| 2012/0231732 | A1 | 9/2012 | Kerselaers | |
| 2013/0257676 | A1 | 10/2013 | Kerselaers et al. | |
| 2014/0184462 | A1 | 7/2014 | Yosui | |
| 2014/0312834 | A1 * | 10/2014 | Tanabe | H02J 7/025 320/108 |

* cited by examiner

*Primary Examiner* — Brian Young

(57) ABSTRACT

Disclosed is an antenna apparatus including a radio frequency (RF) antenna, a magnetic induction (MI) antenna disposed within the RF antenna, and electronic circuitry to receive and process audio received from at least one of the RF antenna and MI antenna.

16 Claims, 5 Drawing Sheets

|  |  |  |  |  |
|---|---|---|---|---|
| AIR | TUNED | -4.2 TO 7.4 | 37-j66 | 31-j33 |
| TOP PLATE TO SAM | NOT TUNED | -5.9 TO -4.5 | 39+j51 | 43+j69 |
| TOP PLATE TO SAM | TUNED | -18 TO -9.5 | 62+j7 | 57+j37 |
| BOTTOM PLATE TO SAM | TUNED | -4.8 TO -8.5 | 28-j47 | 24-j11 |

FIG. 6

COMBINATION ANTENNA

TECHNICAL FIELD

Example embodiments described herein relate to near field antennas in combination with far field antennas.

SUMMARY

A brief summary of various embodiments is presented below. Some simplifications and omissions may be made in the following summary, which is intended to highlight and introduce some aspects of the various embodiments, but not to limit the scope of the embodiments described herein. Detailed descriptions of embodiments adequate to allow those of ordinary skill in the art to make and use the inventive concepts will follow in later sections.

According to one embodiment, there may be provided an antenna apparatus including a radio frequency (RF) antenna, a magnetic induction (MI) antenna disposed within the RF antenna, and electronic circuitry to receive and process audio received from at least one of the RF antenna and MI antenna.

The RF antenna may communicate over a first distance and the MI antenna communicates over a second distance different than the first distance. The first distance may be far-field and the second distance may be near-field.

The RF antenna may be cylindrical. The MI antenna may be cylindrical.

The RF antenna may include an antenna body, a first conductor plate disposed at one end of the antenna body, and a second conductor plate disposed at a second end of the antenna body; and an electrically conductive filament arranged within the antenna body of the RF antenna to electrically couple the first plate with the second plate.

The RF antenna may include a dielectric layer disposed between the MI antenna and the first conductor plate. The electrically conductive filament may be arranged within the antenna body in an unbalanced way.

The apparatus may include a first connection port connected to the RF antenna and a second connection port connected to the MI antenna.

The electronic circuit may transmit audio through the MI antenna to a portion of a user's body.

The MI antenna may be incorporated into the RF antenna.

According to one embodiment, there may be provided an antenna apparatus for a portable electronic device including a magnetic induction (MI) antenna that comprises a magnetic coil structure for near-field communication, a radio frequency (RF) antenna for far-field communication that includes a three-dimensional support body, an electrically conductive first plate on a first surface of the support body, an electrically conductive second plate on a second surface of the support body, wherein the first surface and the second surface are arranged on opposing ends of the support body, and an electrically conductive filament arranged within the support body, electrically coupling the first plate with the second plate.

The MI antenna structure may be incorporated in the RF antenna structure.

The antenna may include a first and a second feeding connection, wherein both feeding connections are configured to electrically connect to a signal processing device for processing an electrical signal received or to be transmitted by the antenna.

A maximum dimension of the apparatus may be less than or equal to half a wavelength of a highest operating frequency of the apparatus.

The apparatus may include a receiver or transmitter unit and a matching unit connected between the receiver or transmitter unit and the antenna feeding connections of the RF antenna, the matching unit being adapted to substantially match the impedance of the RF antenna structure to the impedance of the receiver or transmitter unit.

The portable electronic device may be a hearing aid.

BRIEF DESCRIPTION OF THE DRAWINGS

Embodiments discussed herein are described in more detail and by way of non-limiting examples with reference to the accompanying drawings, wherein:

FIG. 6 illustrates a table of input return loss and input impedance measurements of the antenna of this invention in 2.4-2.5 GHz in different cases of an example embodiment.

DETAILED DESCRIPTION

Figure 1:
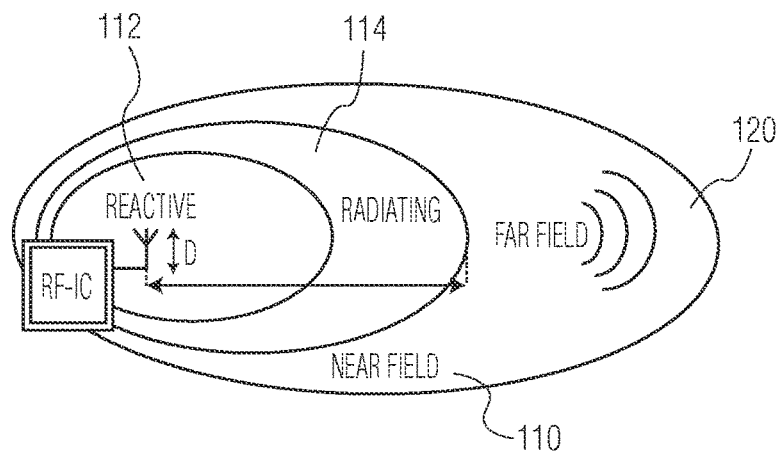
FIG. 1 illustrates different regions around an antenna system of an example embodiment.

Reference is made herein to the attached drawings. Like reference numerals are used throughout the drawings to depict like or similar elements described herein.

Example embodiments described herein provide a communication antenna apparatus that may generate and receive magnetic induction (MI) fields having inductive coupling characteristics in a near-field region in combination with generation and reception of electro-magnetic (EM) waves in a far-field or RF region.

Wireless communications exist in a near-field region and in a far-field region. In a far-field region, information may be transferred through radiation of EM waves. There are alternatives to using EM waves for applications using short range communication. When communication over very short distances is required there are alternatives to using EM transmission within close proximities of a transmitter or receiver.

MI communication maybe an efficient technique for short range communication. In MI communication, amplitudes of near-field waves tend to decrease faster than amplitudes of far-field electromagnetic waves. A near-field may decrease faster than electromagnetic waves as it travels through a communication channel. These and other characteristics may result in a limited communication range.

While far-field may refer to a region around a radiating antenna in which electro-magnetic waves are radiated into space, the term near-field may describe a region close to a transmitting antenna in which non-radiating magnetic waves exist.

A boundary between the near-field and far-field region may not be fixed and the boundary may change with operating frequency. The boundary between a near-field and far-field region may be defined using transmission range, wave impedance or phase variation of radiation.

An antenna system according to example embodiments may be used for body and other near field applications in the consumer lifestyle and healthcare area. A combination antenna system may be integrated into portable products attached to or adjacent the human body. Example apparatuses may include hearing aids, ear buds, headphones, and behind-the-ear hearing aids.

An antenna system of example embodiments described herein may be used in systems such as described in patent application US20120231732A1, incorporated herein by reference.

Figure 7:
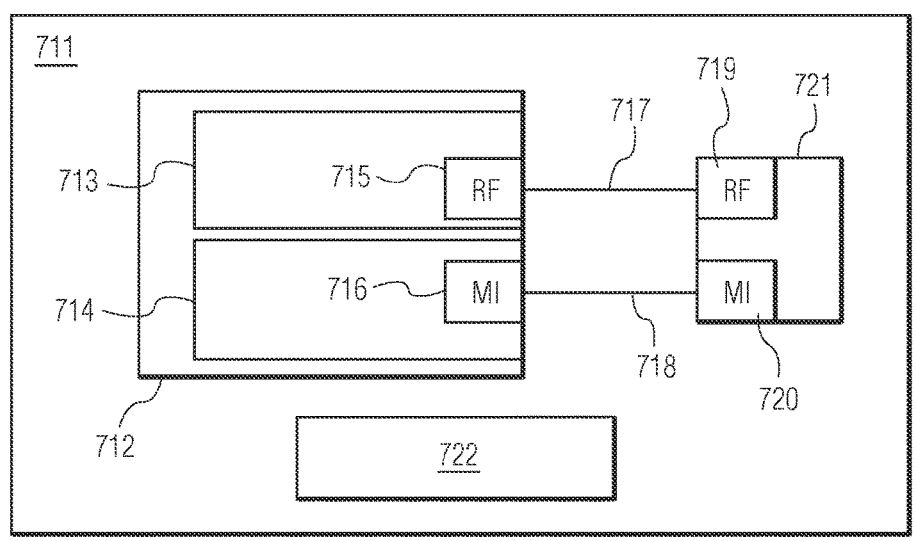
FIG. 7 illustrates a block diagram comprised of a radio IC connected to the proposed new antenna system in an example hearing aid of an example embodiment.

In example embodiments described herein antenna diversity may be achieved using a separate antenna in each of two sub-units or earpieces, one sub-unit for each ear. A sub-unit may be a hearing device 711 as illustrated in FIG. 7 and described herein. Separate sub-unit antennas may communicate with a communication device by wireless radio frequency (RF) transmission using EM waves to receive a best or clearest signal in either of the two earpieces. Upon detecting a sound, one sub-unit may be obstructed and not receive a clear signal. Once a determined clearest signal is received in one of the two sub-units, the clearer audio transmission may be communicated from one sub-unit to another by way of MI such that a user may hear the clearest transmission in both ears.

The combination antenna according to embodiments may support near-field diversity with an MI link between two hearing aids using an incorporated MI ferrite antenna into an RF antenna structure described herein.

The combination antenna system of example embodiments described herein may combine two structures. A first structure includes a magnetic coil. A second structure may include an antenna design for an RF antenna as described in patent application number US20130257676A1, also incorporated herein by reference.

The RF antenna structure in the combination antenna system may collect RF information from a communication device located away from a body of a person or entity using a hearing apparatus with the combination antenna housed therein.

Inductive coupling is a method that may be used in hearing aids for wireless audio communication. Using inductive coupling, a relatively large voltage, which may be 12V AC, may be imposed upon a coil that generates a magnetic field as a result thereof.

Within a short range of a first coil of an antenna that is positioned in or near a first ear, from a few centimeters to 1 meter, a magnetic field may be induced in a second coil in a second antenna positioned in or near a second ear, other part of the body, or within close proximity to establish short range communication there between.

Radios and other electronic devices communicating in this manner may thus use MI to establish a wireless link. The MI field is a non-propagating near field that has a very high roll-off behavior, losing field strength as a function of distance from the antenna.

To establish communication across a longer range, for instance greater than 1 meter, systems may use a radio or antenna module that works with EM radiation. Electromagnetic waves are able to propagate over large distances and the power rolls off as the inverse of the square of the distance from the source.

FIG. 1 illustrates different regions around an antenna of example embodiments described herein. Two main regions are near-field 110 and far-field 120. In a far-field region 120, a combination of electric and magnetic waves propagates as electromagnetic waves. An electromagnetic wave includes an electric field and a magnetic field, which are perpendicular to each other and to the direction of propagation.

As illustrated in FIG. 1, the near-field region 110 may include two sub-regions: a reactive region 112 and a radiating region 114. In the radiating region 114, an angular field distribution depends on distance, while in the reactive zone 112, energy is stored and not radiated. A precise boundary between these two regions may be determined based on the specific application.

Communication in the near-field may occur through the use of an electric field or a magnetic field. Example embodiments described herein discuss near field communication using magnetic induction fields.

Figure 2:
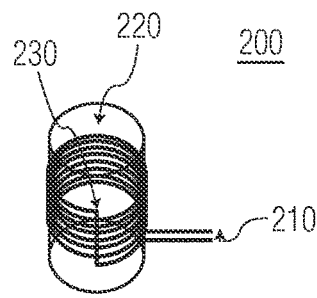
FIG. 2 illustrates a magnetic antenna of an example embodiment.

FIG. 2 illustrates a magnetic induction antenna 200 of an example embodiment. This type of antenna may be used in MI based hearing aids. As illustrated in FIG. 2, copper wires 230, known as copper windings, may be wound around a cylindrical volume 220. When an alternating current is passed through the windings 230, an electromagnetic field is generated. A ferrite core may be inserted as the cylindrical volume 220 within the windings 230. A generated magnetic field in a transmit mode may be increased by having the ferrite core as the cylindrical volume 220. Connection port wires of the coil antenna 200 are shown at position 210. The connection wires may connect to interface circuitry to send and receive audio and information through the MI antenna 200.

Figure 3:
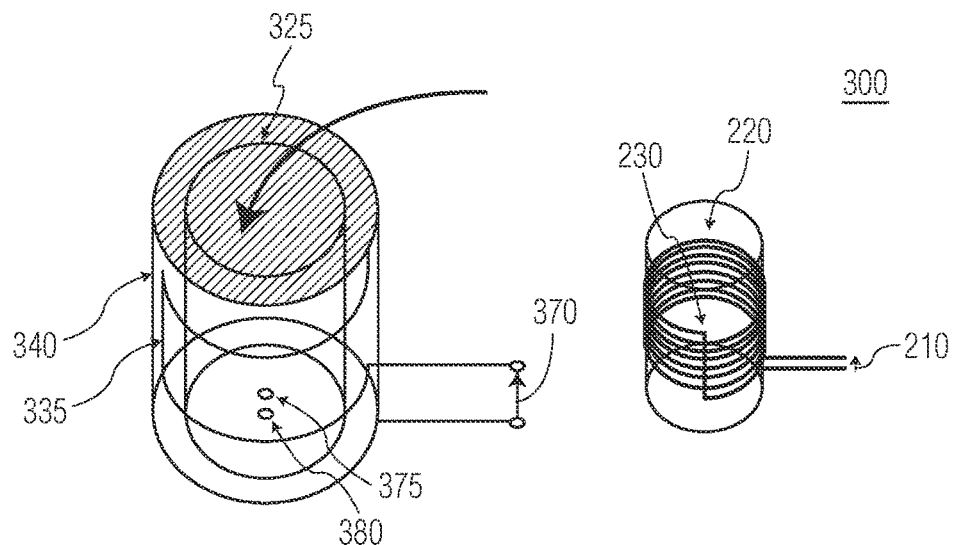
FIG. 3 illustrates an antenna system according to an example embodiment.

FIG. 3 illustrates an antenna system 300 according to an example embodiment in conjunction with FIG. 2. The antenna system 300 includes a combination of an RF antenna structure 340 and the magnetic antenna 200 that includes the ferrite core 220 and windings 230. The RF antenna 340 may be constructed in a similar manner to that described in patent application US 2013/0257676A1, incorporated by reference herein.

RF antenna 350 may be formed by a hollow antenna body dielectric cylindrical tube, support body, or container 340 in which two opposing conducting circular surface plates 315 and 325 are placed as antenna elements at one end and an opposing end of the cylindrical container 340. Along the body of the cylindrical tube 340 such as along or within an outside wall thereof, an inductive wire or filament 335 is formed that connects the top plate and bottom plates 315 and 325 respectively.

The magnetic antenna 200 including a ferrite core 220 and copper windings 230 may be formed of various sizes to meet various applications, likewise as may the RF antenna structure 350.

When an alternating current passes through the wire 335 a distributed inductance together with the capacitance formed by the two antenna elements 315, 325 and the insulating cylindrical tube 340, resonate at a frequency band of operation.

Feeding port connections 370 may be connected to the inductive wire 335 in an unbalanced manner, encircling close to half of the cylindrical tube 340. Feeding port connections 210 of ferrite core 220 may pass through port holes 375, 380 of the antenna system 300 to connect to integrated circuitry. The ferrite coil 230 is inserted so as to not contact the cylinder tube 340 at the conducting circular surfaces 315 or 325. A dielectric such as air, foam or solid material may separate the ferrite core 220 from the antenna plates 315 and 325.

The connection ports 370 are positioned more towards one antenna plate than another. This allows current flow to be different through one plate or the other. Example embodiments are not limited thereto. Alternatively, port connections 370 may be placed equidistant from a center of the tube 340 to allow current flow to be uniform through the RF antenna 350. Also, filament 335 maybe wound totally around the cylindrical tube 340 to increase the inductance thereof.

Methods of forming and testing the combination antenna apparatus will now be described. In order to test whether the performance of the RF antenna 350 would be affected by insertion there into of the ferrite coil 200. A proof-of-concept of the far-field antenna structure 350 was configured in the 2.5 GHz range with an example height of the cylindrical tube 340 of 7 mm, an outer diameter of 3.8 mm, and an inner diameter of 2 mm. The tubing may be made from Low-density polyethylene (LDPE) to achieve a desired dielectric constant and loss tangent characteristic thereof. A maximum dimension of the combination antenna apparatus may be less than or equal to half the wavelength of a highest frequency of the apparatus.

As described herein, the ferrite volume 220 and coil 230 for a near-field MI antenna 200 may be incorporated in the far-field antenna structure 350. The ferrite coil 200 including volume 220 may have a diameter of 1.8 mm, a length of 6 mm and inductance of 3.6 uH.

To verify the desired effects, performance characteristics of the combination antenna were measured. Measurements included a magnetic induction performance and RF performance of the antennae 200 and 300.

One portion of the test involved measuring the performance of the ferrite core 200 on its own and comparing the performance characteristics of the ferrite core 200 with the combination antenna 300 to determine the differences, if any, of the MI near field transmission characteristics.

On its own, an inductance value of the original ferrite 200 was 3.6 uH. The series resistance Rs=0.56 Ohm at 1 kHz. The sensitivity of the original ferrite core 200 at 10 MHz was 40 uV for a magnetic field strength (H) of 1 mA/m.

Incorporated into the RF antenna 350, the inductance value of the ferrite 200 was 3.8 uH, the series resistance Rs=0.57 Ohm at 1 kHz. The sensitivity of the incorporated ferrite core 200 at 10 MHz is 41.3 uV for H=1 mA/m with the RF antenna port open or short circuited.

From these measurements one may observe that the MI performance of the ferrite core coil 200 was not altered significantly by incorporating the MI antenna 200 into the RF antenna 350. Therefore, in combination, the incorporated MI antenna may be used effectively for near-field communications.

Figure 4:
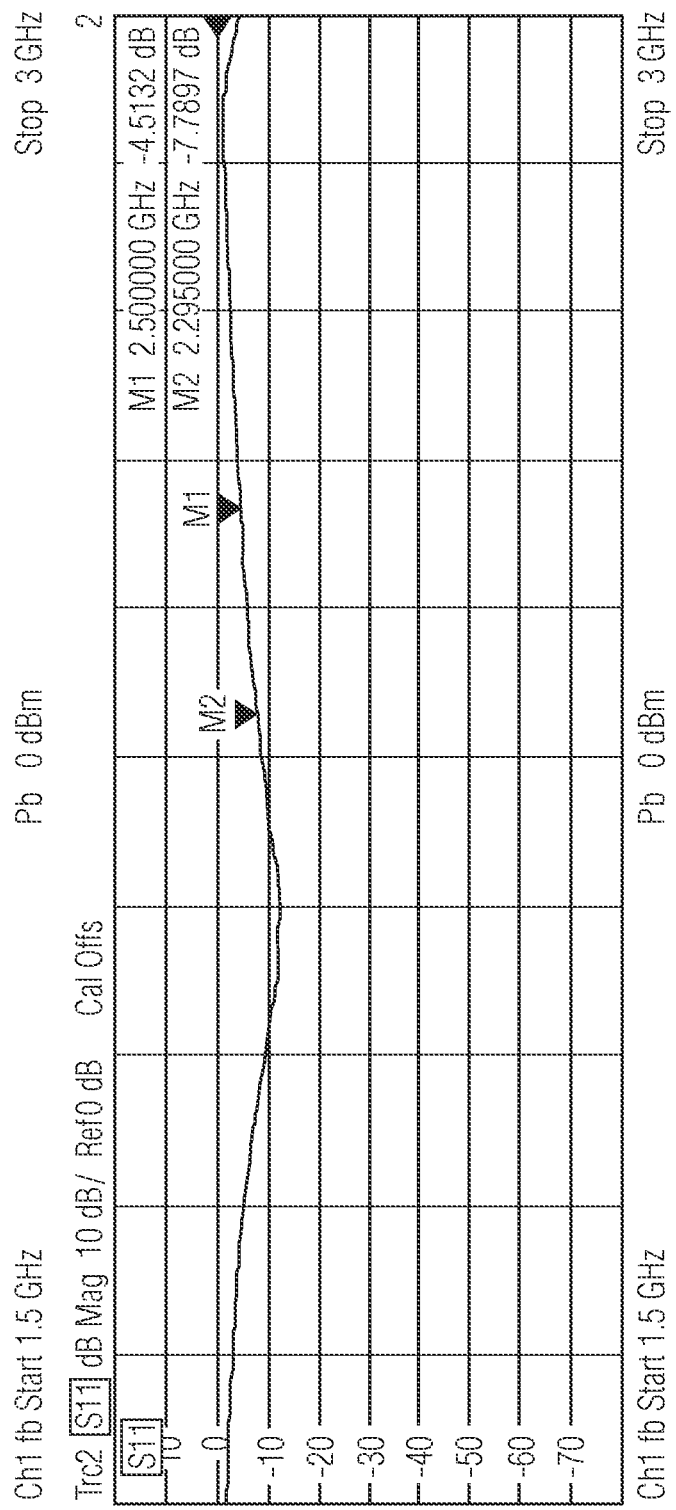
FIG. 4 illustrates input return loss when the RF antenna port was not matched to 50 Ohm or not 'tuned' of an example embodiment.
Figure 5:
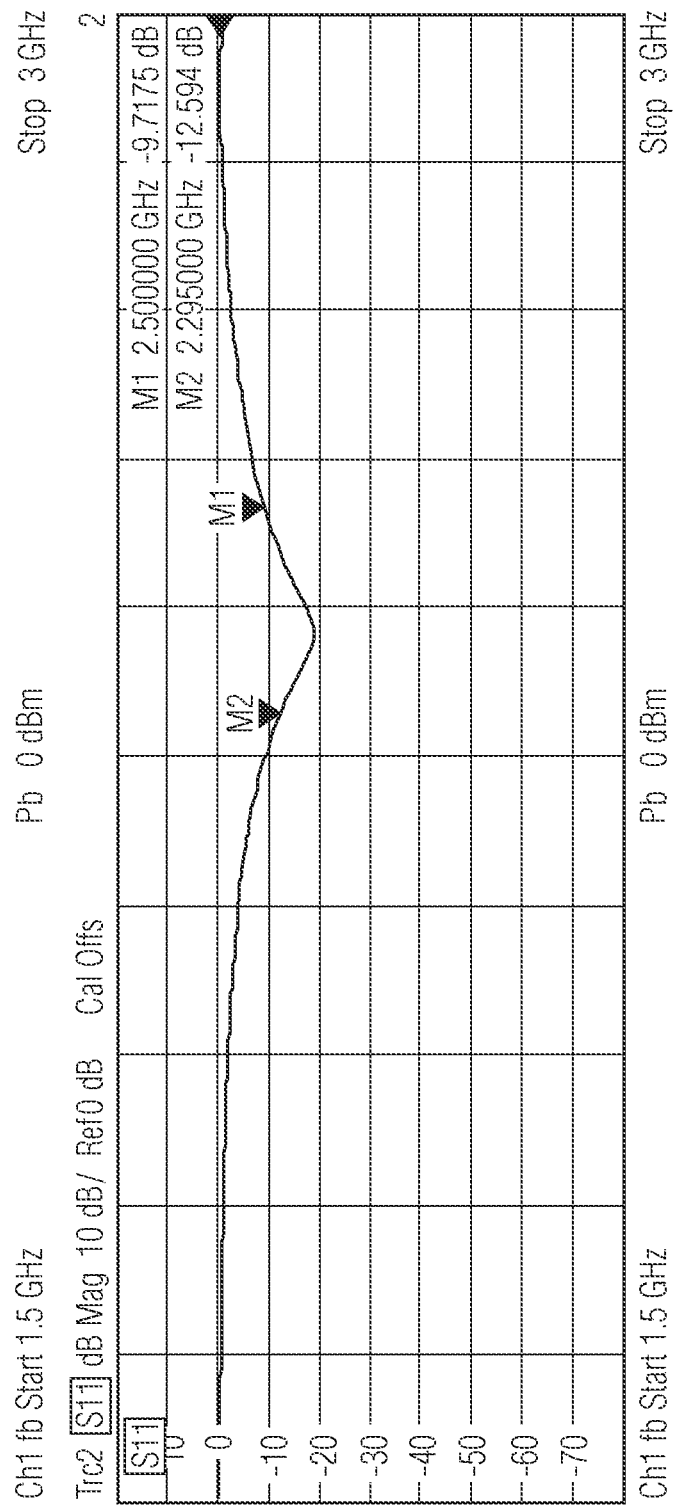
FIG. 5 illustrates input return loss when the RF antenna port is matched to 50 Ohm or 'tuned' of an example embodiment.

FIGS. 4-6 illustrate results from tests conducted with the antenna system of embodiments described herein attached to a SPEAG SAM head model such as SAM-V4-SBSE. A series of tests was performed to determine RF performance evaluated by means of the input impedance of example embodiments.

FIG. 4 illustrates the input return loss ($S_{11}$) when the RF antenna port was not matched to 50 Ohm or not 'tuned' to the head model. The input return loss of the RF antenna port relates to the input impedance of that port. The formulas to convert input return loss, $S_{11}$, to input impedance, $Z_{in}$, or vice versa are, $$Z_{in} = Z_0 \frac{(1+S_{11})}{(1-S_{11})} \text{ and } S_{11} = \frac{Z_{in}+Z_0}{Z_{in}-Z_0}$$

with, $Z_0$, characteristic impedance, for example. 50 Ohms.

FIG. 5 illustrates input return loss ($S_{11}$) when the RF antenna port is matched to 50 Ohm or 'tuned' to the head model. The input return loss of the RF antenna port relates to the input impedance of that port.

FIG. 6 illustrates a table that summarizes the input return loss and input impedance measurements of the antenna of example embodiments when a transmission was conducted in the 2.4-2.5 GHz range for different cases. In one example, when a top plate of the RF antenna 350 was oriented towards the top of the SAM head, a best performance is measured in terms of return loss and input impedance.

In a 2.4-2.5 GHz range, a return loss (RL) from −9.5 dB to −18 dB was obtained. Lower values correspond to better matching. Other return losses where the RF antenna 350 was tuned to air, the top plate was not tuned to SAM, and where the bottom plate was tuned towards the top of the dummy SAM head produced higher, and thus less favorable, results.

One factor in tuning the combination antenna to the SAM model, and thus to a head of user of the apparatus, may correspond to the unbalanced manner in which the filament 335 may be formed along the outer shell of the RF antenna 350. Additionally the coil may be formed closer to either antenna plate 315 or 325 to allow a beneficial tuning to take place.

In the 2.4 GHz to 2.5 GHz range, input impedance was also measured. In this range the tuned antenna ranges from (62+j7) Ω to (57+j37) Ω. For the lesser favored orientations, input impedances were differing more from (50+j0) Ω.

FIG. 7 illustrates a block diagram including a radio integrated circuit connected to a combination antenna system of an embodiment such as in a hearing aid or similar devices. In the embodiment, the integrated circuit components illustrated in FIG. 7 maybe present in each hearing-type device situated in a hearing device on or near a user's body.

A hearing device 711 such as a hearing aid or ear bud may include hearing aid electronics 712 that include processing circuitry, a combination antenna apparatus 721 and a loud speaker and microphone unit 722. Hearing aid electronics 712 may receive and process audio received from the RF antenna and/or the MI antenna of the combination antenna apparatus 721, and may also transmit audio through the one or both of the RF antenna and MI antenna of the combination antenna 721.

Hearing aid electronics 712 may include radio circuitry 713 for RF communication and radio circuitry 714 for MI communication. An RF radio input/output interface 715 may connect to a RF feeding connection I/O port 719 of the combination antenna 721 through a connection 717 such as a connecting wire. An MI radio input/output interface 716 may connect to a magnetic antenna feeding I/O connection port 720 of the combination antenna 721 of embodiments described herein through a connection 718 such as a connection wire.

A combination antenna according to embodiments described herein may be formed in which near-field and far-field antenna communication systems may be combined in a single device, making use of beneficial characteristics of each antenna.

It should be noted that the above-mentioned embodiments illustrate rather than limit the embodiments described herein, and that those skilled in the art will be able to design many alternative embodiments without departing from the scope of the appended claims. The word "comprising" does not exclude the presence of elements or steps other than those listed in a claim. The word "a" or "an" preceding an element does not exclude the presence of a plurality of such elements. The embodiments described herein may be implemented by means of hardware including several distinct elements. In the device claim enumerating several means, several of these means may be embodied by one and the same item of hardware. The mere fact that certain measures are recited in mutually different dependent claims does not indicate that a combination of these measures may not be used to advantage.

What is claimed is:

1. An antenna apparatus comprising:
a radio frequency (RF) antenna comprising:
an antenna body:
a first conductor plate disposed at one end of the antenna body; and
a second conductor plate disposed at a second end of the antenna body; and an electrically conductive filament arranged within the antenna body of the RF antenna to electrically couple the first plate with the second plate;
a magnetic induction (MI) antenna disposed within the RF antenna; and
electronic circuitry to receive and process audio received from at least one of the RF antenna and MI antenna.

2. The apparatus of claim 1, wherein the RF antenna communicates over a first distance and the MI antenna communicates over a second distance different than the first distance.

3. The apparatus of claim 2, wherein the first distance is far-field and the second distance is near-field.

4. The apparatus of claim 1, wherein the RF antenna is cylindrical.

5. The apparatus of claim 1, wherein the MI antenna is cylindrical.

6. The apparatus of claim 1, comprising a dielectric layer disposed between the MI antenna and the first conductor plate.

7. The apparatus of claim 1, wherein the electrically conductive filament is arranged within the antenna body in an unbalanced way.

8. The apparatus of claim 1, comprising a first connection port connected to the RF antenna and a second connection port connected to the MI antenna.

9. The apparatus of claim 1, wherein the electronic circuit transmits audio through the MI antenna to a portion of a user's body.

10. The apparatus of claim 1, wherein the MI antenna is incorporated into the RF antenna.

11. An antenna apparatus for a portable electronic device comprising:
a magnetic induction (MI) antenna that comprises a magnetic coil structure for near-field communication;
a radio frequency (RF) antenna for far-field communication that comprises:
a three-dimensional support body;
an electrically conductive first plate on a first surface of the support body;
an electrically conductive second plate on a second surface of the support body,
wherein the first surface and the second surface are arranged on opposing ends of the support body; and
an electrically conductive filament arranged within the support body, electrically coupling the first plate with the second plate.

12. The apparatus of claim 11, wherein the MI antenna is incorporated in the RF antenna structure.

13. The apparatus of claim 11, wherein the antenna apparatus comprises a first and a second feeding connection, wherein the first and second feeding connections are configured to electrically connect to a signal processing device for processing an electrical signal received or to be transmitted by the antenna.

14. The apparatus of claim 11, wherein a maximum dimension of the apparatus is less than or equal to half a wavelength of a highest operating frequency of the apparatus.

15. The apparatus of claim 11, further comprising:
a receiver or transmitter unit; and
a matching unit connected between the receiver or transmitter unit and the antenna feeding connections of the RF antenna, the matching unit being adapted to substantially match the impedance of the RF antenna structure to the impedance of the receiver or transmitter unit.

16. The apparatus of claim 11, wherein the portable electronic device is a hearing aid.

* * * * *